(No Model.)
E. WESTON.
RHEOSTAT.
No. 480,893. Patented Aug. 16, 1892.
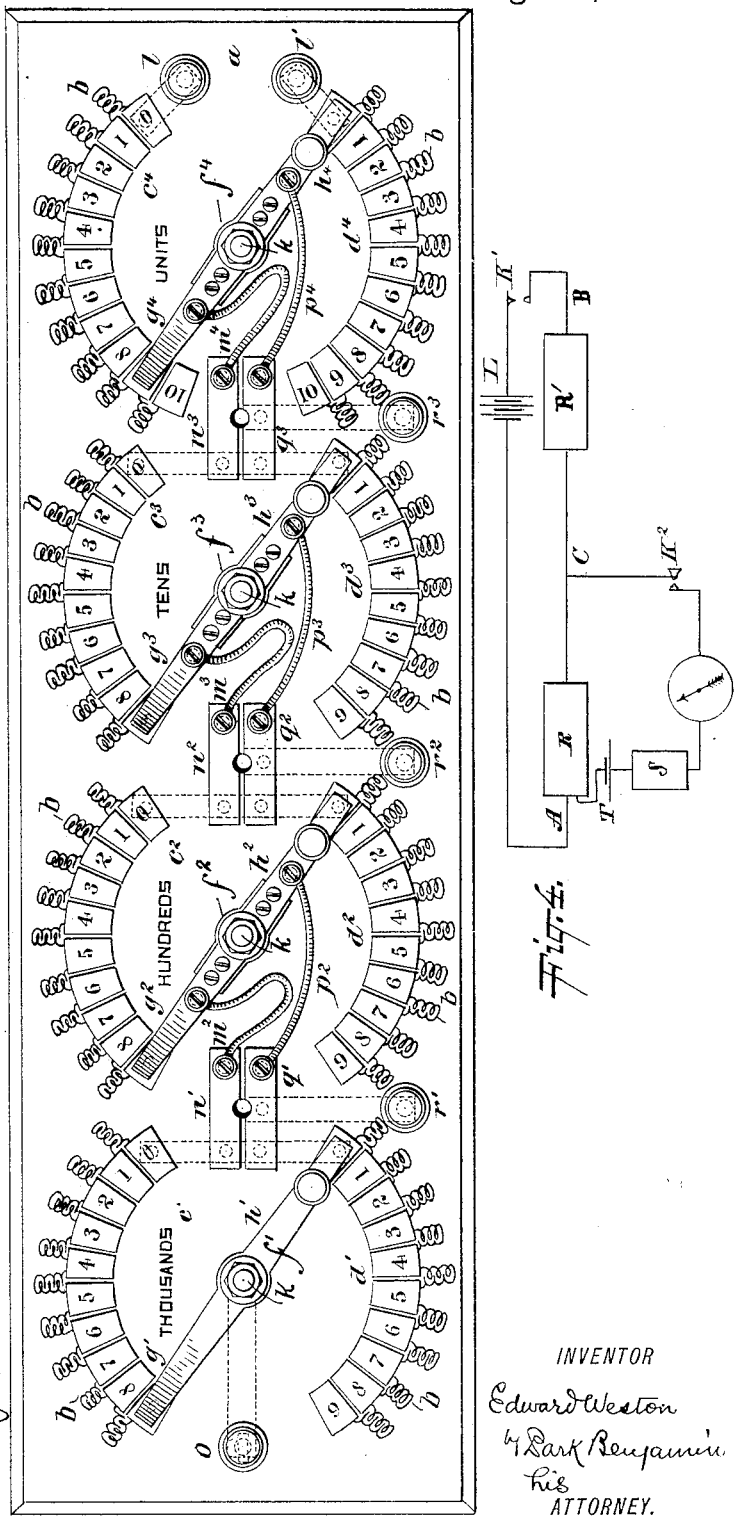
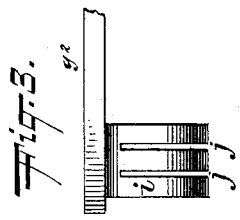
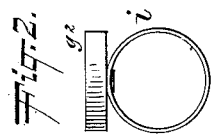
WITNESSES:
Gustave Dieterich
M. Posch.
INVENTOR
Edward Weston
by Park Benjamin
his
ATTORNEY.

UNITED STATES PATENT OFFICE.

EDWARD WESTON, OF NEWARK, NEW JERSEY.

RHEOSTAT.

SPECIFICATION forming part of Letters Patent No. 480,893, dated August 16, 1892.

Application filed December 10, 1891. Serial No. 414,569. (No model.)

*To all whom it may concern:*

Be it known that I, EDWARD WESTON, of Newark, Essex county, New Jersey, have invented a new and useful Improvement in Resistance Apparatus, of which the following is a specification.

My invention consists in two or more series of resistances and mechanism for changing the relation of one or more resistances of each series to a circuit including both series, the said mechanism being constructed and organized so that when it establishes circuit through a given resistance of one series it simultaneously and automatically cuts out of circuit an equal resistance of the other series.

My invention further consists in the construction and arrangement of said resistances and mechanism as hereinafter more particularly set forth.

The best mode of comparing standard cells is by the so-called "compensation methods," in which one cell is balanced against another, and an excellent arrangement for that purpose has been devised by Lord Rayleigh. This is illustrated in the diagram Fig. 4. The compensating battery L consists of two Leclanché elements. It is connected in series with two resistance-boxes R R', joined by a short thick wire and a key K'. The derived circuit consists of the cell T under test, a high-resistance galvanometer, a coil of high resistance S, (to prevent accidental strong currents passing through the cell,) and a key K². R and R' are adjusted until a balance is obtained; but the resistance between A and B is always kept equal to ten thousand ohms. The cell T is then replaced by a second cell T', and a new balance is obtained. If we call the resistances between A and C in the two cases, $r$ and $r'$ then $\frac{T}{T'} = \frac{r}{r'}$.

It will be apparent that when the resistance in R is increased it must be correspondingly decreased in R', and vice versa, in order to keep the total resistance between A and B equal. This in practice is difficult to do, as the changes in resistance are often very small. To effect the adjustment by inserting and removing plugs in the usual forms of resistance-coils is slow because of the numerous trials that must be made, so that when this method is adopted for testing standard cells in large numbers, as becomes necessary when such apparatus is commercially produced, the loss of time and chances of error involved become a serious drawback.

I have chosen this method for description herein because it illustrates an important application of my present invention, and at the same time shows the utility of it in perhaps the simplest manner. The principle of my said invention is this: to organize and construct two resistances so combined and arranged with suitable mechanism that when a definite portion of one resistance is thrown out or put in circuit an equal compensating portion of the other resistance will be, in the first case, put in, and, in the second case, thrown out of that circuit automatically. One observer can therefore adjust both resistances and can certainly know that the sum of both is always a uniform quantity with greater ease than he can adjust a single resistance.

In the accompanying drawings, Figure 1 is a plan view of my improved resistance apparatus, the resistance-coils being represented in the usual diagrammatic manner. Figs. 2 and 3 are face and side views of the contact spring or wiper employed on the movable arms, and Fig. 4 is an electrical diagram of Lord Rayleigh's compensation method, before explained.

Similar letters of reference indicate like parts.

$a$ is a box or case containing the resistance-coils, which are diagrammatically indicated at $b$. On the upper side of the case are arranged two sets of contact-plates $c'$ $c^2$ $c^3$ $c^4$ and $d'$ $d^2$ $d^3$ $d^4$. The resistance-coils $b$ are inteposed between adjacent plates—as in the series $c'$, for example, between the plates "0" and "1," "1" and "2," and so on. One set of plates $c'$ to $c^4$, with their coils $b$, represents the resistance R in the diagram Fig. 4, and the other set of plates $d'$ to $d^4$, with their coils, represents the other resistance R' in said diagram; or generally, the plates $c'$ to $c^4$ and coils $b$ constitute one independent set of resistances, and the plates $d'$ to $d^4$ and their coils $b$ another set. The resistance-coils $b$, interposed between the plates $c'$ and also between the plates $d'$, are each of a resistance of one thousand ohms; those between the plates $c^2$ and the plates $d^2$ are each of a resistance of one hundred ohms; those between the plates $c^3$ and the plates $d^3$ are each of a resistance of ten ohms, and those between the plates $c^4$ and the plates $d^4$ are each of a resistance of one ohm.

In each of the series $c'\,d'$, $c^2\,d^2$, $c^3\,d^3$ there are ten contact-plates which may be numbered from "0" to "9," successively, as shown. In the series $c^4$ and $d^4$ there are eleven contact-plates numbered from "0" to "10," successively, as shown. The plates $c'\,d'$ are disposed about the circumference of a circle, and the other series $c^2\,d^2$, $c^3\,d^3$, and $c^4\,d^4$ are similarly disposed Pivoted at the center of each circle, on the circumference of which are disposed the plates $c^2\,d^2$, $c^3\,d^3$, and $c^4\,d^4$, is a bar $f^2\,f^3\,f^4$ of insulating material, and supported on this bar are diametral arms $g^2\,h^2$, $g^3\,h^3$, and $g^4\,h^4$. The arms of each pair, as $g^2\,h^2$, are thus insulated from one another. Pivoted at the center of the circle, around the circumference of which are disposed the plates $c'\,d'$, is a bar $f'$ of metal, the extremities of which form arms $g'\,h'$, corresponding to the similar arms $g^2\,h^2$, &c., as above described. At the extremity of each arm, and bearing upon each series of plates, is a contact spring or wiper $i$, as shown in Figs. 2 and 3. This consists of a tube of thin copper having transverse slits, as $j$, Fig. 3. The arms are pressed downward by the nuts $k$ so that the springs $i$ are slightly flattened and by their elasticity make close frictional contact against the plates as the arms are turned on their central pivots.

The circuits in the instruments are as follows: The first circuit is from the binding-post $l$ to the plate "0" of the series $c^4$, thence through the several coils (one or more) and plates of said series to the arm $g^4$, thence by the flexible conductor $m^4$ to the plate $n^3$, thence to the series of plates $c^3$ and their coils $b$ to the arm $g^3$, thence by the flexible conductor $m^3$ to the plate $n^2$, thence to the series of plates $c^2$ and their coils $b$ to the arm $g^2$, thence by the flexible conductor $m^2$ to the plate $n'$, thence to the series of plates $c'$ and their coils $b$, and thence to the arm $g'$ to the pivot of said arm, and thence to the binding-post $o$. The second circuit proceeds similarly from the binding-post $l'$ to the plate "0" of the series $d^4$ and through the several coils (one or more) and plates of said series to the arm $h^4$, flexible conductor $p^4$, and plate $q^3$, thence to the coils and plates of the series $d^3$, arm $h^3$, flexible conductor $p^3$, and plate $q^2$, thence to the coils and plates of the series $d^2$, arm $h^2$, flexible conductor $p^2$, and plate $q'$, thence to the coils and plates of the series $d'$, arm $h'$, and binding-post $o$. The plates $q'\,q^2\,q^3$ connect with binding-posts $r'\,r^2\,r^3$. Between each pair of plates, as $q'\,n'$, are openings to receive metallic plugs of the usual kind, which establish electrical communication between the said pair of plates. If one circuit-terminal is connected to the binding-post $o$ and the other be connected to the post $r'$ and the plug be inserted between plates $q'\,n'$, it will be evident that only the series of plates $c'\,d'$ will be in circuit. If the terminal be connected to post $r^2$ and the plug be inserted between plates $n^2\,q^2$, then the series of plates $c'\,d'$ and $c^2\,d^2$ will be in circuit. If the terminal be connected to post $r^3$ and the plug be inserted between plates $n^3\,q^3$, then the series of plates $c'\,d'$, $c^2\,d^2$, and $c^3\,d^3$ will be in circuit. If no plugs be inserted and one terminal is connected to post $o$ and the other to post $l$, then the plates of series $c'\,c^2\,c^3\,c^4$ will be in circuit. If no plugs be inserted and one terminal be connected to post $o$ and the other to post $l'$, then the plates of series $d'\,d^2\,d^3\,d^4$ will be in circuit.

The foregoing is sufficient to indicate the various changes which may be made in the instrument and to suggest others to any one skilled in the art.

Returning now to the diagram Fig. 4, I have already stated that the series of plates $c'\,c^2\,c^3\,c^4$ may be taken as representing the resistance R and the series $d'\,d^2\,d^3\,d^4$ the resistance R'. The binding-post $o$ then represents the point C, between the two resistances, from which the circuit leads to the galvanometer, and the binding-posts $l\,l'$, the points A B, at which the resistances R R' are joined in circuit with the battery L, Fig. 4.

For purposes of illustration in explaining the use of the instrument, I will assume the contact-arms to be disposed as shown in the drawings. Then it is evident that the total resistance offered by series $c'$ is nine thousand ohms; by series $c^2$, nine hundred ohms; by series $c^3$, ninety ohms, and by series $c^4$ nine ohms, or in the aggregate nine thousand nine hundred and ninety-nine ohms. If the arm $g^4$ were moved to plate "10" of series $c^4$, then the total resistance would be one ohm more—or ten thousand ohms. On the other hand, it is obvious that all the coils $b$ of series $d'\,d^2\,d^3\,d^4$ are cut out of circuit, so that the aggregate of both resistances is, as desired, ten thousand ohms. Now suppose it be desired to cut out one thousand ohms from one series $c'\,c^2\,c^3\,c^4$, which, for brevity, I will hereinafter term R, while at the same moment adding one thousand ohms to the series $d'\,d^2\,d^3\,d^4$, hereinafter termed R', clearly all that is necessary is to move the arm $g'$ from the plate "9" of series $c'$ to the plate "8." The arm $h'$ will necessarily move from the plate "0" of series $d'$ to the plate "1." The other parts remaining as before, the resistance in R will read "$8,999+1=9,000$ ohms," and the resistance in R' will read "1,000 ohms," and the aggregate resistance will still be ten thousand ohms.

If it be desired to remove one hundred ohms from R, the arm $g^2$ is moved from the plate "9" of series $c^2$ to plate "8," and simultaneously the arm $h^2$ moves from plate "0" of series $d^2$ to plate "1," and thereby adds one hundred ohms to series R', and generally, as will be evident, the movement of the arms $g'\,h'$ from one plate of series $c'\,d'$ to another adds one or more thousand ohms to R' and subtracts an equal amount from R, and by the movement of the arms $g^2\ h^2$, $g^3\ h^3$, and $g^4\ h^4$ the hundreds, tens, or units ohms are added and subtracted in like manner, of course, and this is a special advantage of the apparatus. The addition and corresponding subtraction are made simultaneously and by infallible mechanical means, so that there is no plugging or unplugging of one resistance and then a long and wearisome series of trial unpluggings and pluggings of the other to make a balance. It saves time and trouble and makes no errors. In brief, it lessens the labor of the working electrician and substitutes machine-work for brainwork.

I have shown the apparatus herein arranged to deal with resistances ranging from units ohms to thousands of ohms. Of course it would be easy to add further similar series of plates and coils with contact-arms and connections disposed in precisely the same way and increasing the capacity of the instrument on one side to tenths, hundredths, and thousandths (or any other fractional parts of ohms) and on the other side to tens of thousands of ohms, hundreds of thousands, and so on through any multiple numbers.

It will be clear in the present instrument that if I desire to confine R to units ohms I have only to make connection at the binding-post $r^3$ instead of to binding-post $o$; if to tens of ohms, to binding-post $r^2$, or if to hundreds of ohms, to binding-post $r'$, the connections to posts $l\ l'$ remaining as before; or generally I can cut out in the manner already described one or more series of plates and coils, using the others. It will also be obvious to the electrical workman from what has been said that while the instrument is especially adapted for employment in a compensation method such as described it can easily be used, by suitably adjusting the connections, as an ordinary resistance-coil or form part of a Wheatstone bridge, or be adapted to any other purpose in electrical measurements for which its general construction and capabilities render it suitable.

I claim—

1. The combination of a series of contact-plates and a series of resistances interposed between said plates, a second series of contact-plates and a series of resistances interposed between said plates, two arms of conducting material insulated from one another, and means for moving said arms, respectively, in contact with each of said series, the aforesaid parts being constructed and operating in circuit, so that when one arm cuts out a given resistance of one series the other arm simultaneously puts into circuit an equal resistance of the other series.

2. The combination of two series of contact-plates disposed substantially on the circumference of a circle and opposite to one another, resistances interposed between said contact-plates, and pivoted contact-arms relatively insulated from and disposed diametrically opposite one another.

3. The combination of, first, two series of contact-plates, as $c^2\ d^2$, and interposed resistances, pivoted arms $g^2\ h^2$, relatively insulated from one another and constructed to move over and make contact with said contact-plates $c^2\ d^2$; second, two series of contact-plates, as $c^3\ d^3$, and interposed resistances, pivoted arms $g^3\ h^3$, relatively insulated from one another and constructed to move over and make contact with said contact-plates $c^2\ d^2$, and circuit connections whereby circuit may be established through either of said series of contact-plates, substantially as described.

4. The combination of the several series of contact-plates $c^2\ c^3\ d^2\ d^3$ and interposed resistances, the pivoted arms $g^2\ h^2$, constructed to move over and make contact with the plates $c^2\ d^2$, the pivoted arms $g^3\ h^3$, constructed to move over and make contact with the plates $c^3\ d^3$, circuit connections, and means for breaking or establishing circuit through either pair of arms $g^2\ h^2$ or $g^3\ h^3$ and their associated contact-plates and resistances, substantially as described.

EDWARD WESTON.

Witnesses:
R. C. FESSENDEN,
M. BOSCH.